United States Patent

Müller

[11] 3,880,446
[45] Apr. 29, 1975

[54] HYDROPNEUMATIC SUSPENSION FOR LAND VEHICLES ESPECIALLY TRACKED VEHICLES

[75] Inventor: Christian Müller, Erlangen-Bruck, Germany

[73] Assignee: Frieseke & Hoepfner GmbH, Erlangen-Bruck, Germany

[22] Filed: Nov. 12, 1973

[21] Appl. No.: 414,828

[30] Foreign Application Priority Data
Nov. 11, 1972 Germany............................ 2255348

[52] U.S. Cl............................ 280/124 F; 267/64 R
[51] Int. Cl.............................................. B60g 11/28
[58] Field of Search ..... 280/124 F; 267/64 R, 64 A, 267/64 B, 65 R, 65 D

[56] References Cited
UNITED STATES PATENTS

| | | | |
|---|---|---|---|
| 2,984,501 | 5/1961 | Mercier.................... | 280/124 F |
| 3,499,639 | 3/1970 | Bonnotte.................... | 267/64 R |
| 3,778,081 | 12/1973 | Takahashi.................... | 280/124 F |

*Primary Examiner*—Philip Goodman
*Assistant Examiner*—John A. Carroll
*Attorney, Agent, or Firm*—Karl F. Ross; Herbert Dubno

[57] ABSTRACT

A hydropneumatic suspension system for land vehicles, especially tracked vehicles such as tanks and earth movers, in which a piston connected to a suspended part displaces a hydraulic medium to compress a gas. A second pressurizable gas chamber is provided and is connected to the primary gas-compression chamber by a valve operated with a predetermined lag or delay so that the energy generated by movement of the suspended part toward the chassis or body of the vehicle is stored and supplied to the suspended part at a subsequent time without substantial transformation of the suspension energy into heat or other dissipation of this energy.

8 Claims, 2 Drawing Figures

HYDROPNEUMATIC SUSPENSION FOR LAND VEHICLES ESPECIALLY TRACKED VEHICLES

FIELD OF THE INVENTION

My present invention relates to vehicle suspensions and especially suspensions for land vehicles of the tracked type, e.g. tanks, earth movers and cranes. More particularly, the invention relates to a suspension system having means for storing and releasing the suspension energy.

BACKGROUND OF THE INVENTION

In general a motor-vehicle suspension is disposed between the vehicle chassis or body and a suspended member such as a vehicle wheel or axle and includes in addition to leaf, coil or torsion spring, one or more oscillation-damping or shock-absorbing members. The latter may comprise a piston displaceable in a cylinder and a throttle connecting two chambers and through which the hydraulic medium is displaced in a so-called dashpot. In these systems the oscillation energy of the suspended body is converted into kinetic energy of the liquid in the cylinder and eventually transformed into heat which is dissipated by the shock absorber.

In massive automotive vehicles, especially tracked vehicles which are required to travel over especially uneven ground, the oscillation damping member must be disposed between the body of the vehicle and a wheel capable of undergoing vertical displacement relative to the vehicle body. The displacement can be considered a contraction as the wheel moves toward the body and an expansion as the wheel moves away from the body.

The shock energy produced during contraction is freed, in the absence of a damper, during expansion and results in oscillation of the vehicle body. The vehicle and its spring system thus form an oscillatable system whose characteristic frequency is dependent upon the vehicle mass and the spring constant. As is well known, if the vehicle should travel over ground having a particular undulation characteristic at a certain speed, the oscillation system can reach a resonant state and yield abnormally high oscillation amplitudes.

Under these conditions the mechanical structures of the vehicle may be damaged or overloaded and the operator may be severely disquieted.

Consequently, it has been proposed to prevent or limit such oscillation by shock absorbers or shock dampers of the above described type. However, simple dashpot arrangements are not always satisfactory for relatively massive vehicles which are expected to negotiate, as a matter of course, irregular terrains. One of the problems encountered in this respect is that of dissipation of the energy of the shock-absorber assuming that it is made massive and large enough to provide an effective damper in a tracked vehicle. It has been necessary to provide a coolant flow for this purpose, especially if heat is not to be transferred to the vehicle body and create discomfort for the operator or introduce another factor promoting breakdown of the mechanical system.

It has been proposed, moreover, to provide hydropneumatic oscillation damping systems in which the displacement liquid acts against a gas cushion or pneumatic pressure accumulator separated from the liquid by a flexible membrane having a damping valve. In this case as well the friction of the liquid is converted into heat in the form of compression energy and friction energy and here again the thermal energy must be dissipated.

A second disadvantage of a conventional oscillation damping system of the character described is that the generated thermal energy rapidly produces breakdowns of the shock absorber, in the absence of special precautions to dissipate or eliminate the generated heat. The problem is multiplied by the fact that not only must the oscillation damping heat be eliminated, but the heat of the engine must be dissipated from the vehicle as well.

OBJECTS OF THE INVENTION

It is the principal object of the present invention to provide an improved oscillation damping system for a land vehicle, especially a tracked vehicle, whereby the aforementioned disadvantages are obviated.

Another object of this invention is to provide a long-wearing, low cost and highly effective shock-damping or oscillation-damping system for a land vehicle, especially a tracked vehicle, in which the thermal drawbacks mentioned earlier do not arise.

SUMMARY OF THE INVENTION

The present invention obviates the aforedescribed disadvantages by eliminating in large measure frictional dissipation of shock energy and by providing for the storage of the contraction energy (energy resulting from movement of the vehicle body and wheel toward one another) and release of this stored energy during an expansion phase but at times offset from the beginning of the contraction and expansions phases respectively.

According to this concept, at least part of the oscillation energy which is generated in the hydropneumatic suspension is stored in a separate container and is supplied to the hydropneumatic suspension during a second (expansion) phase.

This storage and resupply of energy, in the form of compression of a gas other than the hydropneumatic suspension gas cushion, is effected by a valve.

The system thus differs from the conventional damping system in which the oscillation energy is dissipated as heat by providing for compression and expansion of a gas out of phase with the beginning of the contraction and expansion phases respectively so that the oscillations are counteracted rather than dissipated. In short, the contraction is counteracted by pressurizing a gas previously stored and a similar counteraction occurs during the expansion phase. Instead of dissipating oscillation energy in the form of heat, therefore, the oscillation tendency is reduced by the supply or the withdrawal of energy in an out-of-phase relationship, to the vehicle oscillation mode.

According to the invention the valve is controlled automatically and in a simple manner by providing it between the pneumatic chamber of the hydropneumatic suspension and the auxiliary pneumatic accumulator and controlling the valve by a member responsive to fluid pressure and enabling the fluid pressure on one side of the member to respond rapidly while a throttle connects this side of the actuating member with the other side. Thus upon contraction and pressure increase in the primary accumulator of the hydropneumatic portion, the pressure builds up but the valve-controlling member does not permit opening of the valve between this chamber and the secondary accumulator until the lapse of a predetermined period as established by the throttle. Upon the lapse of this period, the valve opens and pressure is supplied to the secondary accumulator in which it is stored. During the next phase, the valve member holds the valve closed during expansion for a predetermined period upon the lapse of which stored pressure from the secondary accumulator is released to the primary accumulator.

DESCRIPTION OF THE DRAWING

The above and other objects, features and advantages of the present invention will become more readily apparent from the following description, reference being made to the accompanying drawing in which.

SPECIFIC DESCRIPTION

Figure 1:
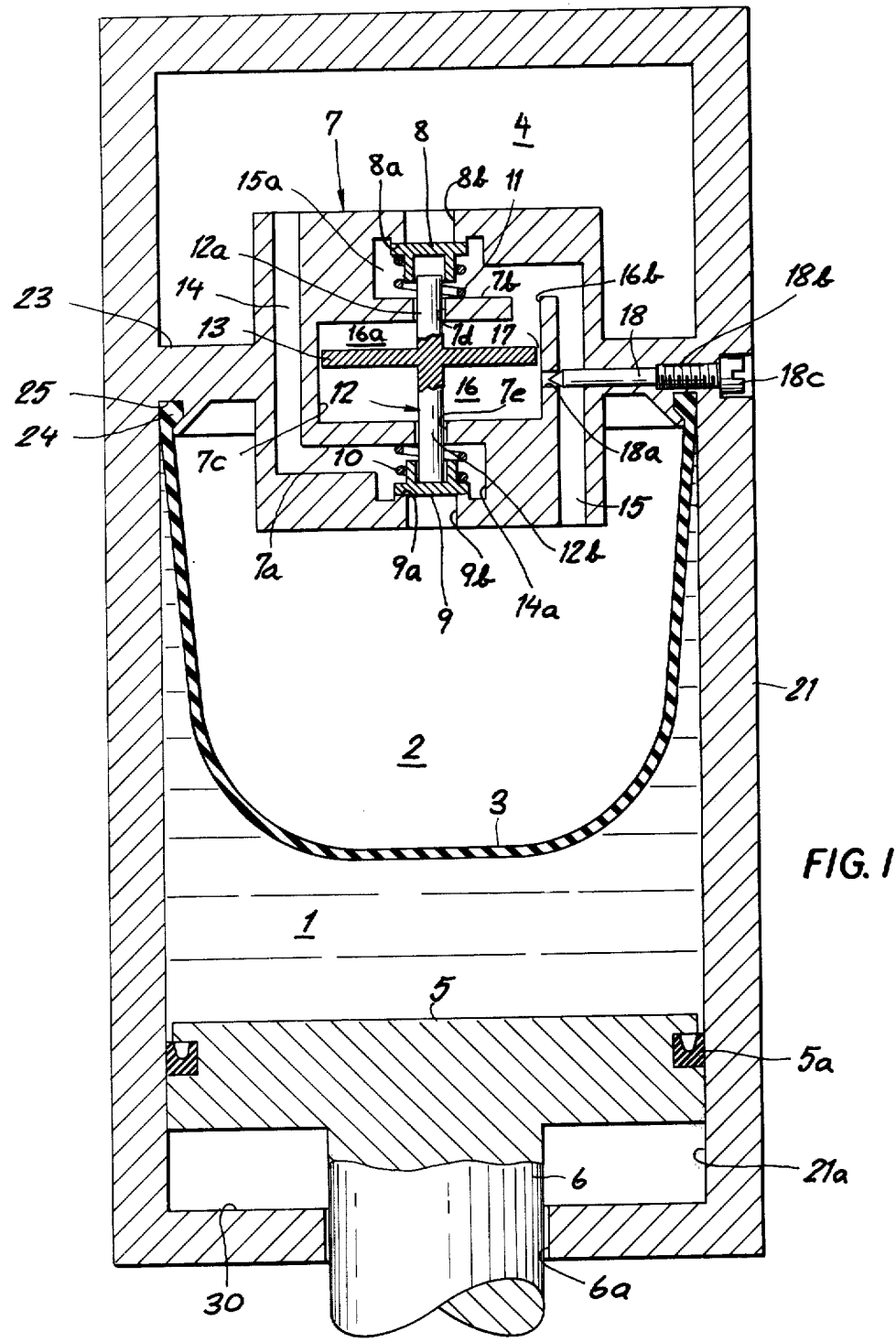
FIG. 1 is a vertical cross-sectional view, partly in diagramatic form of a suspension arrangement according to the invention.

The suspension member illustrated in FIG. 1 comprises a housing 21 forming a main or primary gas accumulator or cushion 2, an auxiliary or secondary gas cushion or chamber 4 separated from the primary chamber 2 by a partition 23, and a liquid-filled space 1 disposed between a piston 5 and membrane 3 separating the hydraulic chamber 1 from the primary accumulator chamber 2.

The piston 5 is provided with a flange-type seal 5a and is connected by a piston rod 6 with the suspended member, e.g. a wheel guiding the track of the vehicle. The housing 21 is attached to the vehicle body or chassis by conventional means. A clearance 6a around the piston rod 6 permits air to flow into and out of the space 21a between the piston 5 and the bottom wall 30 of the housing.

In the wall 23 between the main gas cushion 2 and the pressure-storage cushion 4, there is provided a valve assembly 7 which, in the manner to be described hereinafter, permits out-of-phase communication between the gas cushions.

The blocking valve 7 comprises a valve plate 8 which bears against an annular valve set 8a around a bore 8b under the force of a helical compression spring 11 in a chamber 15a communicating by a passage 15 with the main gas cushion 2.

The oppositely effective plate valve 9 bears against a valve seat 9a surrounding a bore 9b under the force of a helical coil spring 10 in a chamber 14a communicating with a passage 14 which opens into the storage cushion 4. The springs 10 and 11 are respectively seated against walls 7a and 7b of the valve assembly 7.

The valve assembly 7 also includes a chamber 7c between the two valves 8 and 9 and in which a valve-control member 12 is provided. The control member 12 includes a pair of rod portions 12a and 12b respectively, and penetrating into the chambers 15a and 14a for engagement with the valve members 8 and 9. In addition, the valve member 12 is provided with a disk-like control piston 13 which subdivides the chamber 7c into a lower space 16 and an upper space 16a. The space 16a communicates with passage 15 via an opening 16b.

The fluid pressure from the main cushion 2 is applied by a passage 15 to the upper surface of the control piston 13, i.e. to the chamber 16a. The control piston 13 has a diameter which is slightly less than the inner diameter of the cylindrical chamber 7c to form a narrow throttle slit 17 around the periphery of this control piston. Instead of this throttle slit, but preferably in addition thereto, a controllable throttle may be provided between the chambers or opposite sides of the control piston. In the embodiment illustrated, the chamber 7c is formed with a bore 18a into which a valve needle 18 may fit, the latter having a threaded shank 18b enabling the throttle to be adjusted by a screw head 18c from the exterior of the housing 21. Furthermore, the throttle means may be constituted by one or more bores provided directly in the piston 13.

The membrane 3, which may be composed of rubber resistant to the hydraulic fluid, has a bead 24 which is received within an annular groove 25 formed in the housing 21 around the valve assembly 7.

As will be immediately apparent, the piston 5 is shown in its normal (static) rest position, i.e. the suspension is neither contracted nor expanded. Should the vehicle be traveling along a terrain in which a hill or bump is encountered, the wheel or track roller will rise while inertia and gravitational forces acting upon the vehicle body limit the lifting thereof. The suspension thus undergoes contraction in which the piston 5 is displaced upwardly relative to the housing 21 to drive the liquid 1 (a hydraulic medium) in the same direction and compress the volume of the main gas cushion 2.

The pressure rise is transmitted via passage 15 to the space 16a above the control piston 13. Because of the throttle 17 and/18, the chamber 16 has lower pressure than that rapidly increasing in chamber 16a. The pressure differential thus applied to the control piston 13 holds the latter downwardly and, via rod 12b maintains the valve 9 in a closed position. Only toward the end of the contraction stroke, at a time determined by the throttle cross section, is the control piston 12 able to be displaced away from its original position and the valve 9 able to open. The pressure buildup in cushion 2 is thus applied through the valve 9 and passage 14 to the auxiliary gas cushion 4. The pressure transfer thus results in a storage of energy during the contraction stroke in the gas cushion 4 which is not released during return of the piston 5 to its original position.

Upon the expansion stroke, e.g. when the wheel or roller of the track drops away from the vehicle body, the piston 5 moves in the opposite direction while the control piston 13 prevents opening of the valve body 8. The stored energy thus remains past the initial expansion stage. The expansion causes the pressure in the chamber 2 to drop rapidly and thereby lowers the pressure in chamber 16a while chamber 16 remains at an elevated pressure until equalization through the throttle 17 and/18. The control piston 12 is held against the valve member 8 during this period. Upon the lapse of the equalization period, and the development of a sufficient pressure differential across the valve member 8, the valve 8 is opened to permit the stored pressure to flow via passage 15 into the main cushion 2.

From the aforedescribed mode of operation, it can be seen that during the contraction stage, pressure is not bled from the main gas cushion until a predetermined delay interval has elapsed. Similarly the energy is not returned to the main accumulator for a predetermined period after inception of the expansion stroke. The adjustable throttle 18 enables the delay to be established over a very wide range as is necessary for the particular requirements of the vehicle. The throttle 18 can be provided with directional characteristics so that the delay during contraction differs from the delay during expansion. As a result the pressure storage and reapplication of the stored pressure can be applied to prevent the development of a resonant oscillation condition without complex control means and without uncontrolled delays resulting from control trains and the like. This can be understood by the realization that with a sudden pressure increase in chamber 2, the equalization to compartment 16 occurs equally rapidly.

The pneumatic energy transfer from the main cushion 2 to the auxiliary cushion 4 and vice versa is effected with minimum mass transfer. The valve assembly 7 can be provided with replaceable and interchangeable parts and has the advantage that it is of simple construction with few parts. Furthermore, while I prefer to construct the device as a single compact unit, the liquid space 1, the main gas cushion 2 and the storage gas cushion 4 can be made a separate unit with the valve assembly 7 disposed as still another unit in a conduit connecting the main gas cushion and the storage cushion.

Figure 2:
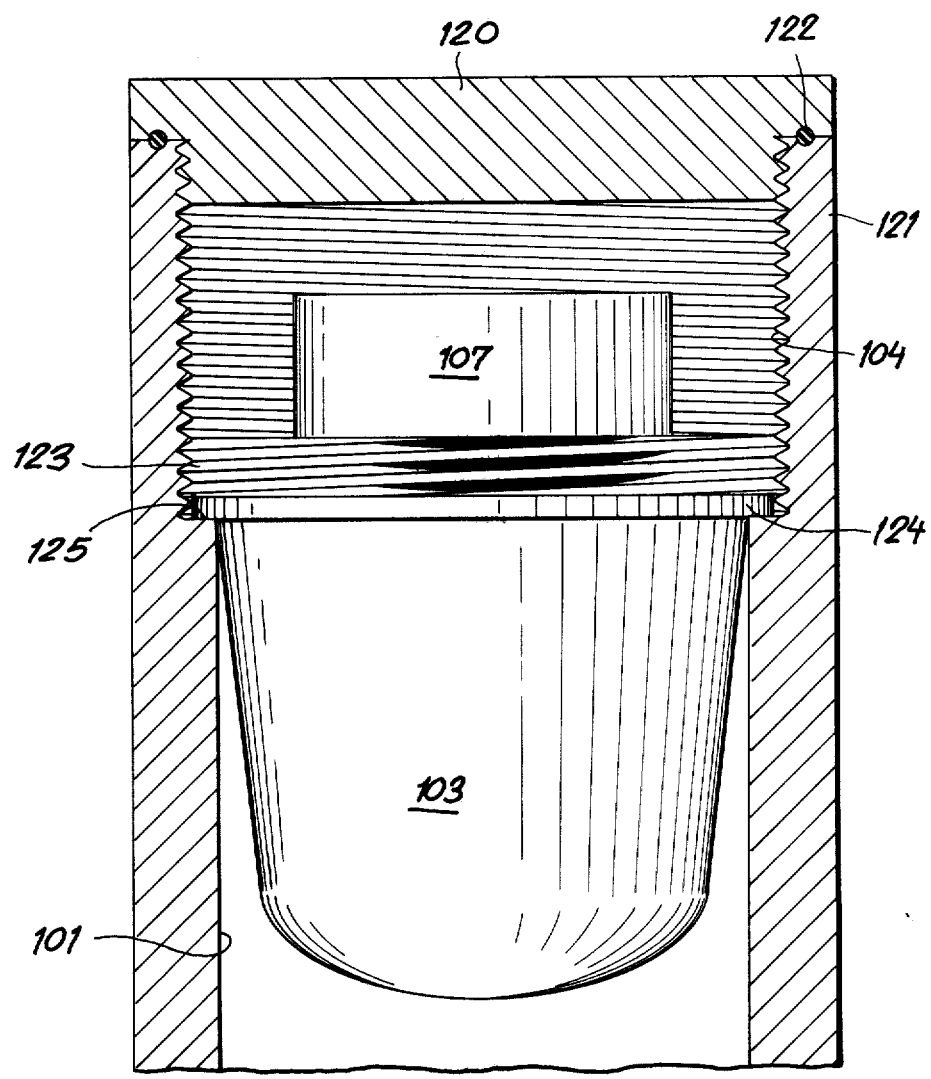
FIG. 2 is a partial sectional view of a modified suspension member.

FIG. 2 shows an ambodiment of the invention in which the valve assembly 107 has the same construction as the valve assembly 7 previously described and in which it is formed integrally with the wall 123. The latter has a disk configuration and is externally threaded as shown in 123 so that it can be screwed into an internal thread of the pressure-storage chamber 104 to clamp the bead 124 of membrane 103 against a shoulder 125. The liquid chamber is provided at 101 below the membrane 103 and a cap 120, having an O-ring seal 122, is threaded into the top of the housing 121 to close the latter. The delay time can be adjusted by replacing the valve assembly 107 and providing in the interchangeable valve assembly throttles of different dimensions.

I claim:

1. A hydropneumatic suspension adapted to be interposed between a body member and a wheel member of a land vehicle, said suspension comprising:
   housing means forming a chamber containing a hydraulic medium connected to one of said members, and a displacement element in said chamber for displacing said medium and connected to the other member;
   means in said housing means forming a main gas cushion pressurizable by said hydraulic medium;
   means in said housing means forming a storage gas cushion; and
   a valve assembly in said housing means directly interconnecting said main gas cushion and said storage gas cushion out of contact with said medium and effective to enable storage of pressure in said storage gas cushion upon pressurization of said main gas cushion and to feed pressure from said storage gas cushion to said main gas cushion upon relief of said main gas cushion, said assembly comprising at least one valve member interposed between said gas cushions, a control piston engageable with said valve member, means for applying the pressure of said main gas cushion to one side of said control piston and a throttle for controlled equalization of pressures on opposite sides of said control piston.

2. The suspension defined in claim 1 wherein said valve assembly comprises a pair of oppositely effective spring-loaded valve members selectively displaceable respectively to permit flow of fluid from one of said cushions to the other cushion and vice versa, said control piston having a pair of rods selectively engageable with said valve members and extending in opposite directions from said control piston, said control piston and said throttle being so constructed and arranged that the valve member controlling the flow from said storage gas cushion to said main gas cushion is blocked upon expansion of said assembly and the valve member permitting fluid flow from said main gas cushion to said storage gas cushion is blocked upon contraction of said suspension.

3. The suspension defined in claim 2 wherein said valve assembly includes a compartment receiving said control piston with an annular clearance at least in part forming said throttle.

4. The suspension defined in claim 2 wherein said throttle has an adjustable cross section and is disposed between the main gas cushion and a compartment separated therefrom by said control piston.

5. The suspension defined in claim 4 wherein said throttle is at least in part formed by an externally adjustable member.

6. The suspension defined in claim 2, further comprising a common housing for said chamber, said gas cushions and said valve assembly, said element including a piston displaceable in said housing, said main gas cushion being separated from said chamber in said housing by a flexible diaphragm, said housing being provided with a wall separating said gas cushions and receiving said valve assembly.

7. A hydropneumatic suspension adapted to be interposed between a body member and a wheel member of a land vehicle, said suspension comprising:
   means forming a chamber containing a hydraulic medium connected to one of said members, and a displacement element in said chamber for displacing said medium and connected to the other member;
   means forming a main gas cushion pressurizable by said hydraulic medium;
   means forming a storage gas cushion; and
   a valve assembly interconnecting said main gas cushion and said storage gas cushion and effective to enable storage of pressure in said storage gas cushion upon pressurization of said main gas cushion and to feed pressure from said storage gas cushion to said main gas cushion upon relief of said main gas cushion, said assembly comprising at least one valve member interposed between said gas cushions, a control piston engageable with said valve member, means for applying the pressure of said main gas cushion to one side of said control piston and a throttle for controlled equalization of pressures on opposite sides of said control piston, said valve assembly comprising a pair of oppositely effective spring-loaded valve members selectively displaceable respectively to permit flow of fluid from one of said cushions to the other cushion and vice versa, said control piston having a pair of rods selectively engageable with said valve members and extending in opposite directions from said control piston, said control piston and said throttle being so constructed and arranged that the valve member controlling the flow from said storage gas cushion to said main gas cushion is blocked upon expansion of said assembly and the valve member permitting fluid flow from said main gas cushion to said storage gas cushion is blocked upon contraction of said suspension, a common housing for said chamber, said gas cushions and said valve assembly, said element including a piston displaceable in said housing, said main gas cushion being separated from said chamber in said housing by a flexible diaphragm, said housing being provided with a wall separating said gas cushions and receiving said valve assembly, said valve assembly comprising a cylindrical compartment formed in said wall between said gas cushions, a pair of bores respectively opening into said gas cushion and aligned along the axis of said compartment, said valve members being seated around the respective bores, said assembly including a first passage connecting said storage gas cushion with a space behind the valve member seated around the bore communicating with said main gas cushion, and a second passage communicating between said main gas cushion and a space formed behind the valve member seated around the bore opening into said storage gas cushion, said control piston being received with an annular clearance at least in part constituting said throttle within said compartment, said compartment communicating with said second passage on one side of said control piston.

8. The suspension defined in claim 7, further comprising an adjustment member threaded into said housing for controlling the cross section of said throttle.

* * * * *